Oct. 22, 1940.   J. M. TOWLER ET AL   2,218,928
RECIPROCATING RAM PUMP
Filed July 23, 1938

INVENTORS
J. M. TOWLER
F. H. TOWLER
BY
ATTORNEYS

Patented Oct. 22, 1940

2,218,928

UNITED STATES PATENT OFFICE 2,218,928

RECIPROCATING RAM PUMP

John Maurice Towler and Frank Hathorn Towler, Yorkshire, England

Application July 23, 1938, Serial No. 220,969
In Great Britain March 19, 1937

7 Claims. (Cl. 74—55)

This invention is concerned with reciprocating ram pumps of the kind comprising three or more rams which are operated through the medium of three or more roller bearings mounted directly upon an equivalent number of circular eccentric portions integral with the eccentric shaft.

Examples of such pumps are described in the specifications of British Patents Nos. 392,992 and 423,929.

With pumps of the above type, which are principally designed to work at speeds up to 1500 reciprocations per minute and at pressures of 5000 lbs. per square inch and over, it is essential that the eccentric shaft shall be comparatively short and rigid and raises the problem of how to mount the one or more intermediate bearings on the corresponding eccentric portions of the shaft. In the specification of British Patent No. 392,992 the difficulty is preferably overcome by making the shaft and eccentric in one piece and separating the eccentric portions from each other by intermediate oval shaft portions, the gaps thus formed permitting the bearings to be displaced laterally between the eccentric portions whereby the bearings can be threaded along the shaft from one or both ends. Alternatively, however, the shaft may be in more than one piece, such as by using one or more composite eccentrics in which case, of course, the gaps will not be required to assist in the positioning of the one or more intermediate bearings.

In the specification of British Patent No. 423,929 the use of such one or more composite eccentrics is described and shown, such composite eccentrics each comprising a portion integral with the shaft and of smaller diameter than the remaining or one piece eccentrics, the discrepancy in size and throw of the inner portion of the composite eccentric being made up by means of a detachable and eccentric bush, which after being positioned on the inner portion is secured against relative movement.

The construction of eccentric shaft according to specification No. 392,992 is for all general purposes quite satisfactory. For very heavy loads however there is always a danger that the shaft will bend at one of the weaker oval intermediate portions. This weakness is still existent but to a lesser extent in the shaft in British Specification No. 423,929 owing to the absence of the intermediate oval portions but for high pressure pumps composite eccentrics are best avoided on account of the tendency for the added or outer portion to become displaced relative to the inner portion and so produce distortion of the encircling ball or roller bearing.

The object of the present invention is to solve the problem of positioning the one or more intermediate bearings in such a manner as will permit the use of an eccentric shaft which can be made out of a single piece of metal with the intermediate portions of the shaft made robust enough to avoid excessive stress under the heaviest loads likely to be encountered and so that the diameter of the bearings normally required for a particular throw will be reduced.

This object is attained according to the present invention by employing roller bearings and dispensing with the inner ring of one or more of the same and using in lieu thereof the peripheral surface of the eccentric portion of the shaft on which it is to be mounted said surface being specially prepared to provide the requisite inner bearing for the rollers. The rollers are positioned within the outer ring or around the surface of the eccentric preparatory to locating the outer ring of the bearing around the eccentric portion on which it is required to be mounted to facilitate which operation the portions intermediate the eccentrics must be wider than the rollers of the bearing to permit the bearing to be threaded along the shaft when positioning. If provision is made for introducing the rollers after each outer ring is in position such as by means of filling slots, or a loose lip on the ring, provision for threading along the shaft becomes unnecessary in which case the portions intermediate the eccentrics can be of less width than the rollers if necessary.

With a shaft assembly as above it is essential to provide means which prevent lateral displacement of each bearing so constructed. This may be effected in a number of ways among which may be mentioned a cross-head on the ram end, a groove in the ram end, or flanges carried by some stationary part of the pump.

The location of the rollers in a bearing assembly as above may be effected by forming an internal groove in each outer ring, an external groove around each eccentric portion or a combination of the two grooves with suitable provision for inserting the rollers.

Where the eccentric shaft is required to have end play in relation to the eccentric bearings a single groove only will be employed, either the internal groove within the outer ring of the bearing with a plain surface for the eccentric portion or an external groove around the periphery of the circular eccentric portion and a plain internal surface for the outer ring of the bearing.

It will be seen that by dispensing with the inner ring of the bearings the shaft whether made as described in the specification of Patent No. 392,992 or otherwise permits of an increased stroke being used for the same strength of shaft or an increased strength of shaft for the same stroke.

In order that the invention may be clearly understood and carried into effect one example will now be described by aid of the accompanying drawing in which.

Figure 1:
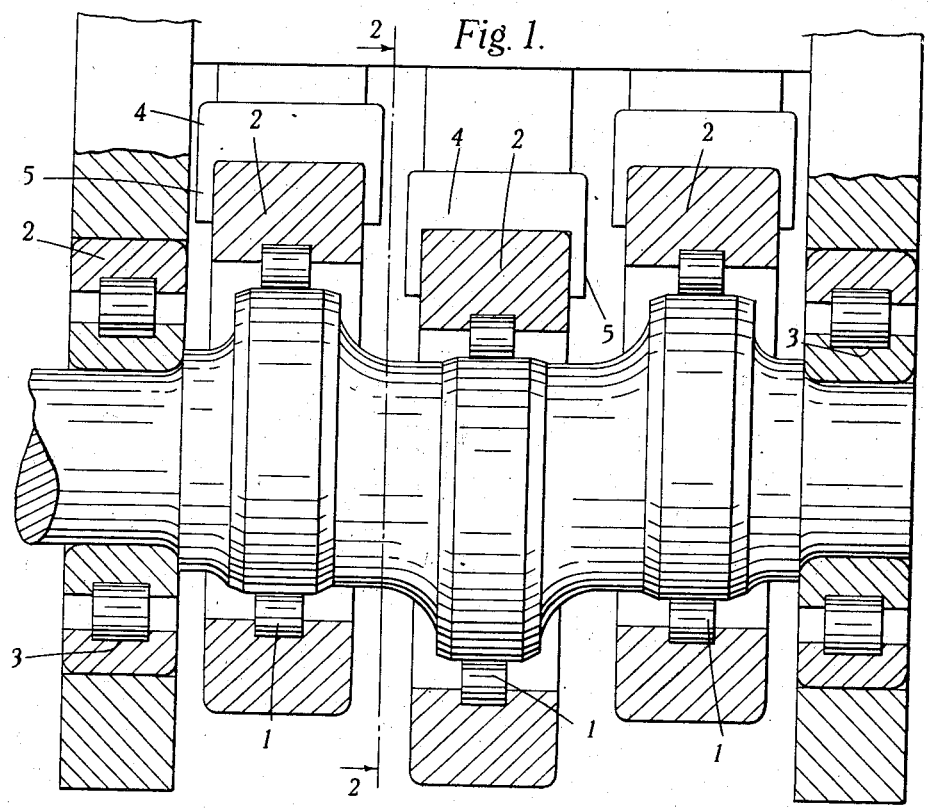
Fig. 1 is an elevation partly in section showing a shaft assembly embodying the present improvements.
Figure 2:
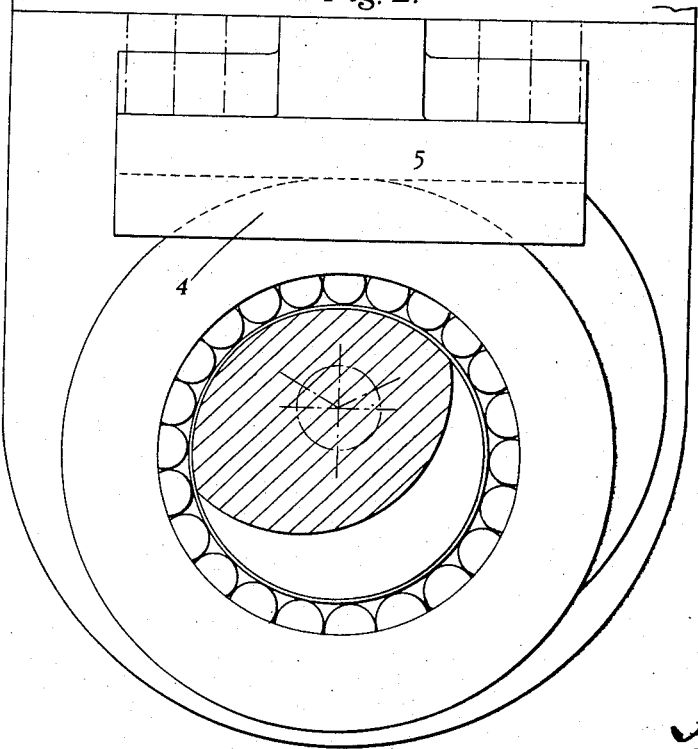
Fig. 2 is a cross section taken on the line 2—2 of Fig. 1.

In the construction shown, the inner ring of each roller bearing is dispensed with, the rollers 1 being interposed directly between the periphery of each eccentric and the outer ring 2 of the bearing, the rollers being kept in position in the usual manner by providing an internal groove 3 in the outer ring.

In the arrangement illustrated lateral displacement of the bearing formed as above is prevented by providing the outer end of each ram with a light crosshead 4, each crosshead having depending flanges 5 which engage the sides of the outer ring of each bearing, thereby locating the same in correct position.

This form of crosshead, which in effect is an enlargement of the end of the ram, is advantageous where the ram is smaller in diameter than the width of the outer ring of the bearing. Where however the diameter of the ram is sufficiently greater than the width of the bearing the same effect may be obtained by slotting the end of the ram.

If desired this crosshead may be provided with two springs not shown one on each side of the ram and housed in recesses in the pump body, such springs serving to effect the outward or suction stroke of the pump ram and to maintain the ram end in contact with the circumference of the eccentric.

Where the crossheads are dispensed with the groove formed in the end of each ram may be of such a depth that the sides of the grooves serve to locate or prevent lateral displacement of the races.

In a still further embodiment not illustrated, location of the bearings may be effected by the provision of flanges projecting inwardly from the crank case. As an alternative construction, the eccentric shaft could be grooved to locate the rollers and the outer races be made as plain rings without lips.

What we claim is:

1. In a high speed, high pressure ram pump of the class described, a plurality of reciprocable rams mounted in close juxtaposition, and a plurality of bearing assemblies for operating the respective rams, an eccentric shaft mounting each bearing assembly, each bearing assembly comprising an inner eccentric circular portion integral with and defining a bearing race on the eccentric shaft, an outer ring portion in rolling contact with the head of its cooperating ram, and a series of rollers interposed between the inner and outer portions said rollers being in slidable relationship axially of the eccentric shaft to permit insertion of the movable portions of the bearing assembly onto the portion thereof integral with the shaft, and means for preventing lateral displacement of each bearing assembly with respect to its associated ram.

2. In a high speed, high pressure ram pump of the class described, a plurality of reciprocable rams mounted in close juxtaposition, and a plurality of bearing assemblies for operating the respective rams, an eccentric shaft mounting each bearing assembly, each bearing assembly comprising an inner eccentric circular portion integral with and defining a bearing race on the eccentric shaft, an outer ring portion in rolling contact with the head of its cooperating ram, and a series of rollers interposed between the inner and outer portions said rollers being in slidable relationship axially of the eccentric shaft to permit insertion of the movable portions of the bearing assembly onto the portion thereof integral with the shaft, and means for preventing lateral displacement of the outer ring portion of each bearing assembly with respect to the ram associated with said assembly.

3. In a high speed, high pressure ram pump of the class described, a plurality of reciprocable rams mounted in close juxtaposition, and a plurality of bearing assemblies for operating the respective rams, an eccentric shaft mounting each bearing assembly, each bearing assembly comprising an inner eccentric circular portion integral with and defining a bearing race on the eccentric shaft, an outer ring portion in rolling contact with the head of its cooperating ram, and a series of rollers interposed between the inner and outer portions said rollers being in slidable relationship axially of the eccentric shaft to permit insertion of the movable portions of the bearing assembly onto the portion thereof integral with the shaft, means for preventing lateral displacement of the rollers of each bearing assembly with respect to the outer ring portion thereof, and means for preventing lateral displacement of the outer ring portion of each bearing assembly with respect to the ram associated therewith.

4. In a reciprocating ram pump of the class described, a series of rams reciprocable in a casing, and ram operating means comprising of a series of assemblies, one for each ram, the assemblies being mounted on an eccentric shaft, and each assembly comprising an eccentric circular portion integral with the eccentric shaft, the respective eccentric circular portions being in close juxtaposition, and relatively rotatable members mounted on said circular portions, the same comprising an outer ring and a plurality of rollers, the rollers being interposed between the outer periphery of the eccentric circular portions and the outer ring defining a race therefor said rollers being in slidable relationship axially of the eccentric shaft to permit insertion of the movable portions of the bearing assembly onto the portion thereof integral with the shaft, and a track formed in either the outer periphery of the eccentric circular portion or the inner periphery of the outer ring associated therewith for mounting the elements of the roller bearing assembly from lateral displacement.

5. In a reciprocating ram pump of the class described, a series of rams reciprocable in a casing and ram operating means comprising of a series of assemblies, one for each ram, the assemblies being mounted on an eccentric shaft, and each assembly comprising an eccentric circular portion integral with the eccentric shaft, the respective eccentric circular portions being in close juxtaposition, and relatively rotatable members mounted on said circular portions, the same comprising an outer ring and a plurality of rollers, the rollers being interposed between the outer periphery of the eccentric circular portions and the outer ring defining a race therefor said rollers being in slidable relationship axially of the eccentric shaft to permit insertion of the movable portions of the bearing assembly onto the portion thereof integral with the shaft, and a track formed in either the outer periphery of the eccentric circular portion or the inner periphery of the outer ring associated therewith for mounting the elements of the roller bearing assembly from lateral displacement, and means on either the surface of the ram or the outer periphery of the outer ring of each roller bearing assembly in rolling contact therewith for preventing lateral displacement of said roller bearing assembly with respect to the ram.

6. In a reciprocating ram pump of the class described, a plurality of reciprocable rams mounted in close juxtaposition and ram operating means comprising of an eccentric shaft mounting thereon a series of movable elements to provide eccentric bearing assemblies spaced in close juxtaposition and formed to provide rolling contact at their outer peripheries with the rams, said eccentric shaft having formed integral therewith bearing surfaces forming a race for one of the movable elements of each of the bearing assemblies mounted thereon said last named movable element of the bearing assembly being in slidable relationship axially of the shaft to permit insertion of the movable elements of the bearing assembly onto bearing surfaces thereof integral with the shaft.

7. In a reciprocating ram pump of the class described, a plurality of reciprocable rams mounted in close juxtaposition and ram operating means comprising of an eccentric shaft mounting thereon a series of movable elements to provide eccentric bearing assemblies spaced in close juxtaposition and formed to provide rolling contact at their outer peripheries with the rams, said eccentric shaft having formed integral therewith bearing surfaces forming a race for one of the movable elements of each of the bearing assemblies mounted thereon said last named movable element of the bearing assembly being in slidable relationship axially of the shaft to permit insertion of the movable elements of the bearing assembly onto bearing surfaces thereof integral with the shaft, said eccentric shaft being of cross section throughout its length substantially approaching the cross section thereof at the portions thereof upon which are mounted the movable elements of the respective bearing assembly whereby sufficient strength is provided for the shaft to operate at high speed, high pressure, and high load.

JOHN MAURICE TOWLER.
FRANK HATHORN TOWLER.